(12) United States Patent
Her et al.

(10) Patent No.: US 11,627,211 B2
(45) Date of Patent: Apr. 11, 2023

(54) ELECTRONIC DEVICE FOR IMPROVING SENSITIVITY OF SENSOR

(71) Applicant: Samsung Electronics Co., Ltd., Suwon-si (KR)

(72) Inventors: Yongkoo Her, Suwon-si (KR); Sungyoung Shin, Suwon-si (KR); Songhee Jung, Suwon-si (KR); Hyunchang Shin, Suwon-si (KR); Byungduk Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 17/263,640

(22) PCT Filed: Sep. 19, 2019

(86) PCT No.: PCT/KR2019/012128
§ 371 (c)(1),
(2) Date: Jan. 27, 2021

(87) PCT Pub. No.: WO2020/060217
PCT Pub. Date: Mar. 26, 2020

(65) Prior Publication Data
US 2021/0195007 A1 Jun. 24, 2021

(30) Foreign Application Priority Data
Sep. 21, 2018 (KR) .......................... 10-2018-0113901

(51) Int. Cl.
*H04M 1/02* (2006.01)
*H04N 13/254* (2018.01)
(52) U.S. Cl.
CPC ....... *H04M 1/0266* (2013.01); *H04M 1/0264* (2013.01); *H04N 13/254* (2018.05)

(58) Field of Classification Search
CPC .............. H04M 1/0266; H04M 1/0264; H04N 13/254; G06F 1/16; G06F 3/0412;
(Continued)

(56) References Cited

U.S. PATENT DOCUMENTS 8,369,018 B2  2/2013  Yamada et al.
9,961,301 B1  5/2018  White
(Continued)

FOREIGN PATENT DOCUMENTS

JP   2012-003585 A   1/2012
KR   10-0905230 B1   5/2009
(Continued)

OTHER PUBLICATIONS

Korean Office Action dated Nov. 30, 2022, issued in Korean Application No. 10-2018-0113901.

*Primary Examiner* — Lester G Kincaid
*Assistant Examiner* — Maryam Soltanzadeh
(74) *Attorney, Agent, or Firm* — Jefferson IP Law, LLP

(57) ABSTRACT

According to an embodiment disclosed in this specification, an electronic device may include a cover glass, a back cover facing away from the cover glass, a display panel exposed through the cover glass, a plurality of pixels disposed on the display panel, a plurality of wires electrically connected to the plurality of pixels, a light source interposed between the display panel and the back cover, a lens interposed between the light source and the display panel and refracting light output from the light source, and a structure for passing through the light output from the light source such that the light output from the light source has a specified pattern. The structure may be interposed between the lens and the cover glass. Besides, various embodiments as understood from the specification are also possible.

13 Claims, 8 Drawing Sheets

(58) Field of Classification Search
CPC .... G06F 3/04166; G06F 3/0421; G06F 3/042; G06F 3/041; G06K 9/00013; G06K 9/00046; G06K 9/0004; G06K 9/40; G06K 9/58; G02B 26/004; G02B 27/286; G02F 1/163
See application file for complete search history.

(56) References Cited

U.S. PATENT DOCUMENTS

| | | |
|---|---|---|
| 10,599,908 B2 | 3/2020 | Jung et al. |
| 2011/0255170 A1* | 10/2011 | Yamada ............... H04N 13/305 359/619 |
| 2018/0121703 A1* | 5/2018 | Jung .................. G06V 40/1318 |
| 2018/0173049 A1* | 6/2018 | Zha ................... G02F 1/133602 |
| 2020/0286436 A1 | 9/2020 | Lim |

FOREIGN PATENT DOCUMENTS

| | | |
|---|---|---|
| KR | 10-2011-0107815 A | 10/2011 |
| KR | 10-2015-0131944 A | 11/2015 |
| KR | 10-2017-0037436 A | 4/2017 |
| KR | 10-2017-0103159 A | 9/2017 |
| KR | 10-2018-0046788 A | 5/2018 |

* cited by examiner

ELECTRONIC DEVICE FOR IMPROVING SENSITIVITY OF SENSOR

TECHNICAL FIELD

Embodiments disclosed in the disclosure relate to a technology for improving sensitivity of a sensor included in an electronic device.

BACKGROUND ART

With development of a technology for mounting various sensors in an electronic device (e.g., a smartphone), a proximity sensor, a three-dimensional (3D) camera, or the like may be mounted in the electronic device. The electronic device may detect whether a user is close to the electronic device, through the proximity sensor. When the detection result indicates that the user is close to the electronic device, the electronic device may turn off a display, thereby preventing the electronic device from malfunctioning. For another example, the electronic device may obtain a 3D image of an external object through the 3D camera.

DISCLOSURE

Technical Problem

As a demand for large display devices has recently increased, a display may occupy most of a front surface of an electronic device. For example, in the case of a full-front display, the entire front surface of the electronic device may be implemented as a display.

When a size of the display increases, a sensor may transmit or receive light through the display. However, the light output from the sensor may be distorted by various wires disposed on the display, and sensitivity of the sensor may decrease. For example, because a distance between a user and the electronic device is not accurate when the light output from a proximity sensor is distorted, the display may be turned off even when the user is not close to the electronic device. When light output from a 3D camera is distorted, the 3D image of an external object may also be distorted.

Embodiments disclosed in this specification are to provide an electronic device for improving sensitivity of a sensor.

Technical Solution

According to an embodiment disclosed in this specification, an electronic device may include a cover glass, a back cover facing away from the cover glass, a display panel exposed through the cover glass, a plurality of pixels disposed on the display panel, a plurality of wires electrically connected to the plurality of pixels, a light source interposed between the display panel and the back cover, a lens interposed between the light source and the display panel and refracting light output from the light source, and a structure for passing through the light output from the light source such that the light output from the light source has a specified pattern. The structure may be interposed between the lens and the cover glass.

Furthermore, according to an embodiment disclosed in this specification, an electronic device may include a cover glass, a back cover facing away from the cover glass, a display panel exposed through the cover glass, a plurality of pixels disposed on the display panel, a plurality of wires electrically connected to the plurality of pixels, and a light source interposed between the display panel and the back cover. Light output from the light source may have a specified pattern while passing through the plurality of wires.

Moreover, according to an embodiment disclosed in this specification, a display may include a display panel on which a plurality of pixels and a plurality of wires electrically connected to the plurality of pixels are disposed, and a structure parallel to the display panel and passing through light output from an external light source such that the light output from the external light source has a specified pattern. A shape of the structure may correspond to a shape in which the plurality of wires are arranged.

Also, according to an embodiment disclosed in this specification, an electronic device may include a light output unit for outputting light in a specified wavelength range, a lens for penetrating and outputting the light output from the light output unit, a pattern layer disposed on the lens and outputting the light output from the lens so as to have a specified shape (pattern), and a transparent member (window) for outputting the light output from the pattern layer to the outside of the electronic device.

Advantageous Effects

According to embodiments disclosed in this specification, sensitivity of a sensor included in an electronic device may be improved.

Besides, a variety of effects directly or indirectly understood through the specification may be provided.

MODE FOR INVENTION

Figure 1:
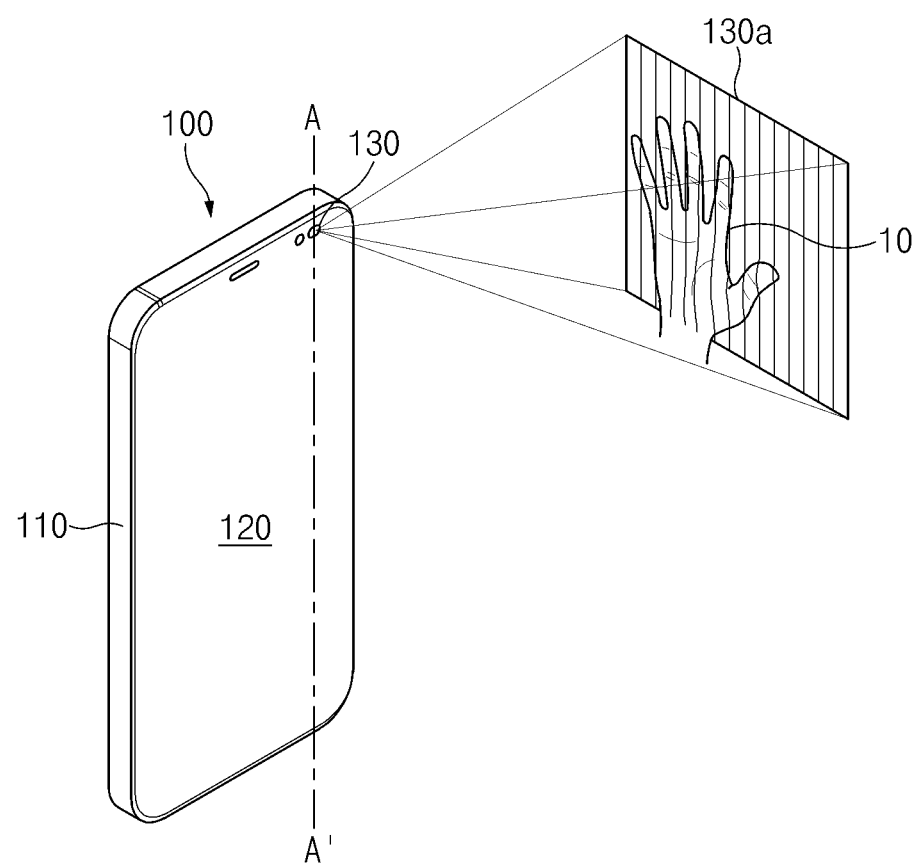
FIG. 1 illustrates an operating environment of an electronic device according to an embodiment.

FIG. 1 illustrates an operating environment of an electronic device according to an embodiment.

Referring to FIG. 1, an electronic device 100 may include a housing 110, a display 120, and a sensor 130.

The housing 110 may form an outer appearance of the electronic device 100. The housing 110 may protect various parts (e.g., the display 120 and the sensor 130) included in the electronic device 100 from external impacts.

The display 120 may be disposed inside the housing 110. The display 120 may output content (e.g., a text, an image, a video, an icon, a widget, a symbol, or the like) or may receive a touch input (e.g., a touch, a gesture, a hovering, or the like) from a user.

The sensor 130 may be disposed inside the housing 110. For example, the sensor 130 may be interposed between the display 120 and the housing 110. According to an embodiment, the sensor 130 may include at least one of a proximity sensor and a 3D camera.

According to an embodiment, the sensor 130 may include a structure (e.g., 133 of FIG. 2A) that allows light output from a light source (e.g., 132 of FIG. 2A) to have a specified pattern 130a. When the light with the specified pattern 130a is reflected back from an external object 10 (e.g., a user's hand), the sensor 130 may calculate a distance to the external object 10 or may obtain a 3D image of the external object 10, based on the reflected light.

According to an embodiment, when the sensor 130 is the proximity sensor 130, the electronic device 100 (or a processor 620 of FIG. 6) may detect whether the user is close to the electronic device 100, through the proximity sensor 130. When the detection result indicates that the user is close to the electronic device 100, the electronic device 100 may turn off the display 120, thereby preventing the electronic device 100 from malfunctioning. For another example, when the sensor 130 is a 3D camera, the electronic device 100 (or the processor 620 of FIG. 6) may obtain a 3D image of the external object 10 through the 3D camera.

In the case of the electronic device according to the comparative example, light output from a sensor may be distorted while passing through a display. For example, because various wires (e.g., a gate line and a data line) are disposed on the display, the light output from the sensor may be distorted by the wires. However, according to an embodiment of the disclosure, the structure 133 that allows the light output from the sensor 130 to have the specified pattern 130a may be disposed inside the display 120 or to be adjacent to a display panel 121. Accordingly, the wires disposed on the display 120 may be aligned with the structure 133, thereby preventing the light output from the sensor 130 from being distorted by the wires. The light output from the sensor 130 may not be distorted by the wires, thereby improving the sensitivity of the sensor 130.

Figure 2A:
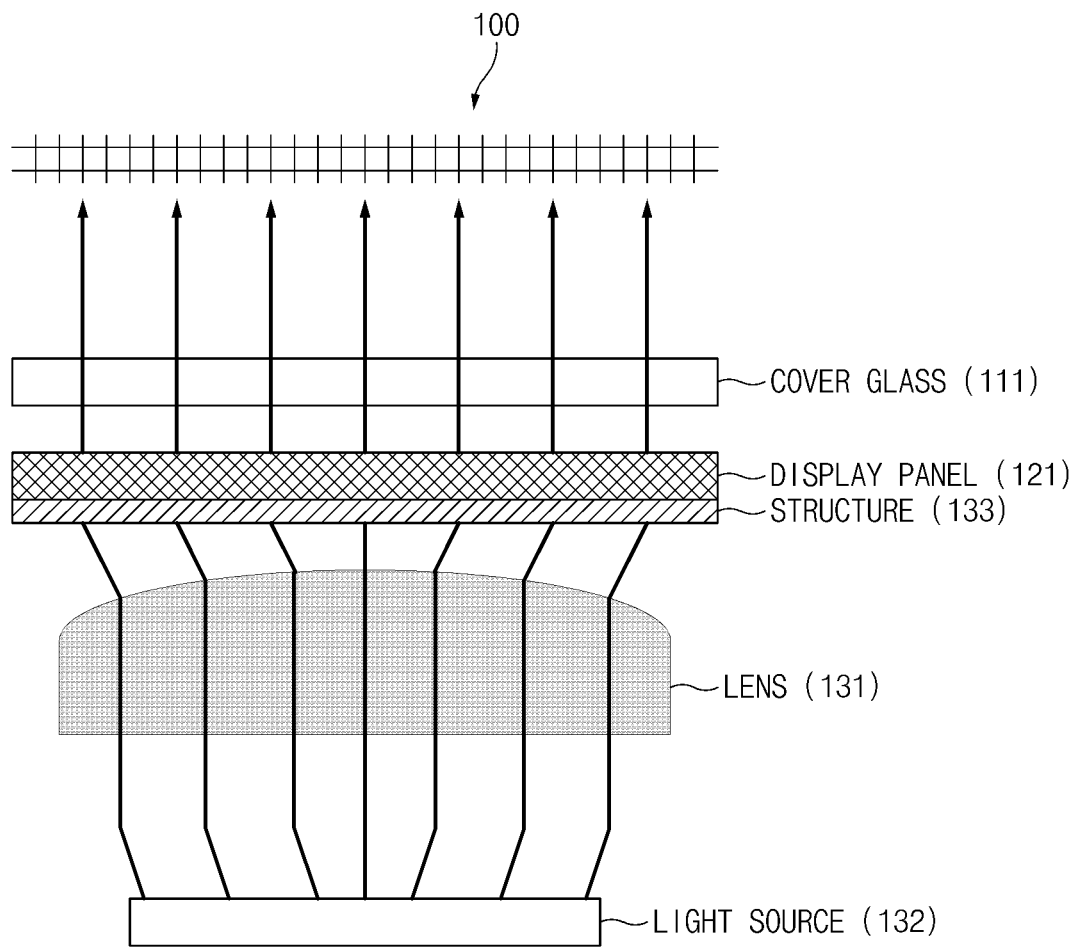
FIG. 2A is a cross-sectional view of an electronic device according to an embodiment.

FIG. 2A is a cross-sectional view of an electronic device according to an embodiment. FIG. 2A is a cross-sectional view of the electronic device 100 illustrated in FIG. 1 taken along a line A-A'.

Referring to FIG. 2A, the electronic device 100 may include a cover glass 111, the display panel 121, and the sensor 130.

The housing 110 may include the cover glass 111 and a back cover (not illustrated). The cover glass 111 may transmit light generated by the display 120. Also, a user may touch a portion (e.g., a finger) of his/her body on the cover glass 111 to perform a touch (including a contact using an electronic pen). For example, the cover glass 111 may be formed of tempered glass, reinforced plastic, a flexible polymer material, or the like. According to an embodiment, the cover glass 111 may also be referred to as a "glass window", a "window", or a "transparent member".

The back cover may be coupled to the rear surface of the electronic device 100. The back cover may be formed of tempered glass, plastic, and/or metal. According to an embodiment, the back cover may be integrally implemented with the cover glass 111 or may be implemented to be removable by the user.

The display panel 121 may be included in the display 120 and may refer to a plate on which pixels (or sub-pixels) and wires for driving the pixels are arranged. The display panel 121 may be interposed between the cover glass 111 and the light source 132 in the electronic device 100.

The sensor 130 may include a lens 131, the light source 132, and the structure 133.

The lens 131 may refract light output from the light source 132. For example, the light output from the light source 132 may face in a specified direction (e.g., in the direction of the cover glass 111) while passing through the lens 131. The light output from the light source 132 aggregates in the specified direction while passing through the lens 131, thereby improving the sensitivity of the sensor 130.

The light source 132 may output light having a specific wavelength. For example, the light source 132 may output light in an infrared and/or visible band. The light output from the light source 132 may have the specified pattern 130a while passing through the structure 133. In this specification, the light source 132 may be referred to as a "light output unit".

The structure 133 may be attached to the display panel 121 or may be disposed in an area adjacent to the display panel 121. The structure 133 may have a shape corresponding to the specified pattern 130a such that the light output from the light source 132 has the specified pattern 130a. For example, as illustrated in FIG. 1, the structure 133 may have a shape corresponding to a grid pattern such that the light output from the light source 132 has the grid pattern.

According to an embodiment, when the light with the specified pattern 130a is reflected back from the external object 10, the electronic device 100 (or the processor 620 in FIG. 6) may detect the external shape, size, depth, or the like of the external object 10 based on the deformation degree of the specified pattern 130a. In this specification, the structure 133 may be referred to as a "pattern layer", and the structure 133 may be included in the display 120.

In the case of an electronic device according to the comparative example, a structure may be positioned between a lens and a light source. Accordingly, light with a specified pattern may be distorted by wires disposed on a display panel while passing through the display panel. The distorted light may reduce the sensitivity of a sensor. However, according to an embodiment of the disclosure, because the structure 133 is attached to the display panel 121 or disposed in an area adjacent to the display panel 121, the shape of the structure 133 may be aligned with the wires disposed on the display panel 121. As such, the extent to which the specified pattern 130a is distorted may be minimized, and thus the sensitivity of the sensor 130 may be improved.

Figure 2B:
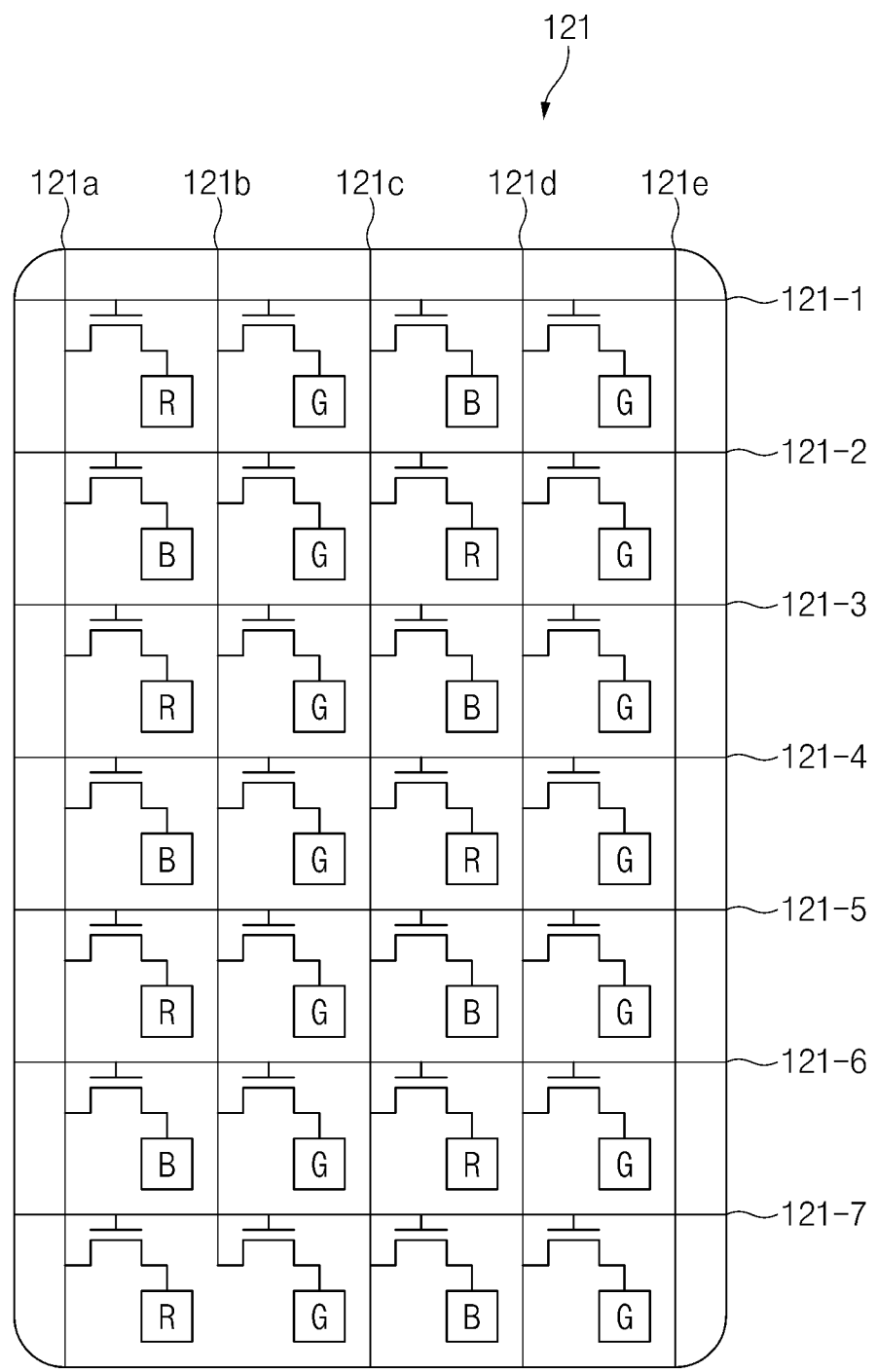
FIG. 2B illustrates a display panel and wires disposed on the display panel according to an embodiment.

FIG. 2B illustrates a display panel and wires disposed on the display panel according to an embodiment. FIG. 2B illustrates a view of the display panel 121 illustrated in FIG. 2A when viewed from the cover glass 111.

Referring to FIG. 2A, a plurality of sub-pixels (R, G, B) may be alternately disposed on the display panel 121. For example, the red sub-pixel (R), the green sub-pixel (G), the blue sub-pixel (B), and the green sub-pixel (G) may be alternately disposed on the display panel 121.

According to an embodiment, the plurality of sub-pixels (R, G, B) may be alternately disposed on the display panel 121. For example, the red sub-pixel (R), the green sub-pixel (G), and the blue sub-pixel (B) may be alternately disposed on the display panel 121.

According to an embodiment, a plurality of sub-pixels may be alternately disposed on the display panel 121. For example, the red sub-pixel (R), the green sub-pixel (G), the blue sub-pixel (B), and a white sub-pixel (not illustrated) may be alternately disposed on the display panel 121.

According to an embodiment, wires for controlling whether the sub-pixels (R, G, B) emit light may be disposed on the display panel 121. For example, a plurality of gate lines 121-1, 121-2, 121-3, 121-4, 121-5, 121-6, and 121-7 and a plurality of data lines 121*a*, 121*b*, 121*c*, 121*d*, and 121*e* may be disposed on the display panel 121. A gate signal for turning on a transistor included in each of the sub-pixels (R, G, B) may be transmitted through the gate lines 121-1, 121-2, 121-3, 121-4, 121-5, 121-6, and 121-7. A data signal for turning on an organic light emitting diode included in each of the sub-pixels (R, G, B) may be transmitted through the data lines 121*a*, 121*b*, 121*c*, 121*d*, and 121*e*.

According to an embodiment, the structure 133 may be attached to the bottom surface (e.g., a surface opposite to a surface where the sub-pixels (R, G, B) are disposed) of the display panel 121 or disposed in an area adjacent to the display panel 121. Accordingly, a shape of the structure 133 may be aligned with a shape in which the wires 121-1, 121-2, 121-3, 121-4, 121-5, 121-6, 121-7, 121*a*, 121*b*, 121*c*, 121*d*, and 121*e* are disposed. As illustrated in FIG. 2B, when the display panel 121 is viewed from the cover glass 111, the structure 133 may not be recognized. Because the shape of the structure 133 may be aligned with the shape in which the wires 121-1, 121-2, 121-3, 121-4, 121-5, 121-6, 121-7, 121*a*, 121*b*, 121*c*, 121*d*, and 121*e* are disposed, the light with the specified pattern 130*a* may be output to the outside of the electronic device 100 without distortion, thereby improving the sensitivity of the sensor 130.

In this specification, the embodiment illustrated in FIG. 2B is an example, and embodiments of the disclosure are not limited to the illustration of FIG. 2B. For example, the wires 121-1, 121-2, 121-3, 121-4, 121-5, 121-6, 121-7, 121*a*, 121*b*, 121*c*, 121*d*, and 121*e* may include wires for driving electrodes included in the sub-pixels (R, G, B); the structure of sub-pixels (R, G, B) may also be different from the illustration of FIG. 2B. Also, in this specification, the description given with reference to FIGS. 1, 2A, and 2B may be identically applied to configurations that have the same reference numerals (or marks) as configurations included in the electronic device 100 illustrated in FIGS. 1, 2A, and 2B.

Figure 3:
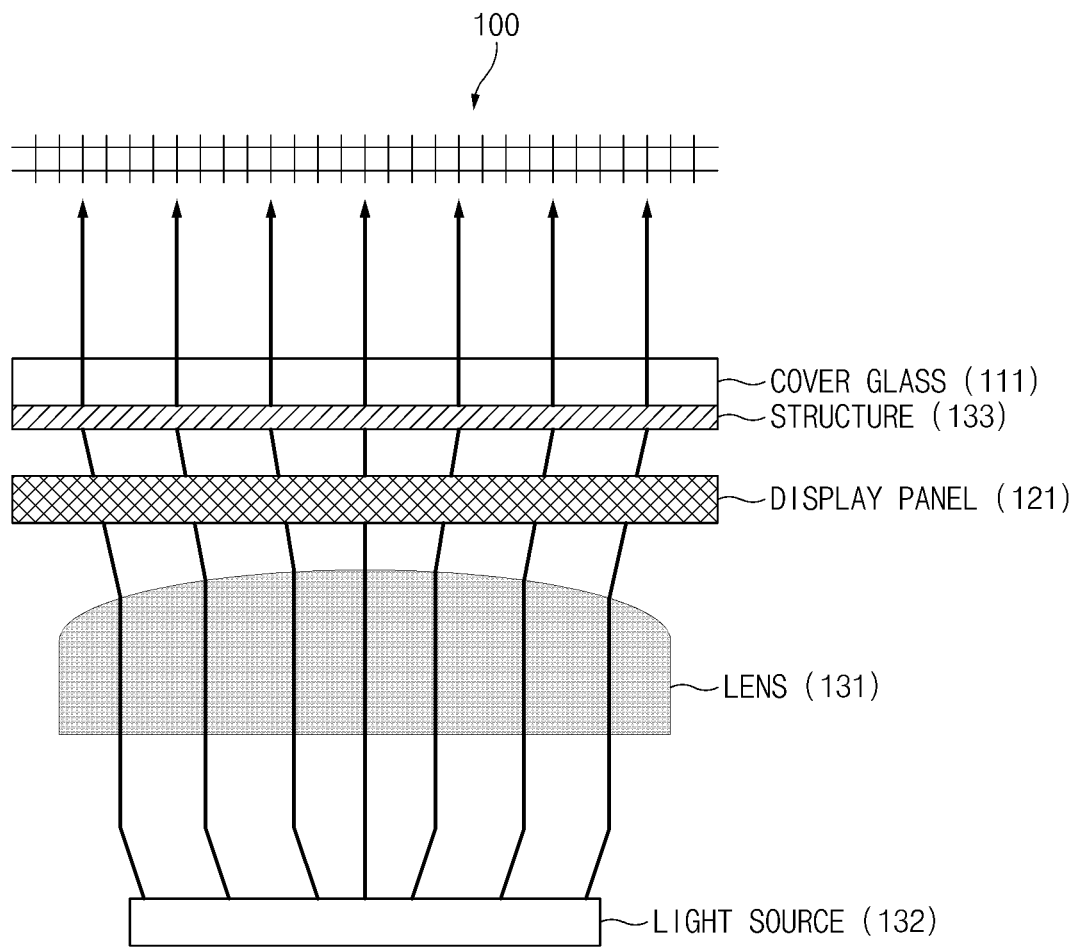
FIG. 3 is a cross-sectional view of an electronic device according to another embodiment.

FIG. 3 is a cross-sectional view of an electronic device according to another embodiment.

Referring to FIG. 3, the structure 133 may be positioned between the cover glass 111 and the display panel 121. In this case, light output from the light source 132 may be output to the outside of the electronic device 100 through the lens 131, the display panel 121, the structure 133, and the cover glass 111. Light passing through the display panel 121 may have the specified pattern 130*a* while passing through the structure 133 again. When the light with the specified pattern 130*a* is reflected back from the external object 10, the electronic device 100 (or the processor 620 in FIG. 6) may obtain a distance between the electronic device 100 and the external object 10, a 3D image of the external object 10, and the like based on the reflected light.

In the case of an electronic device according to the comparative example, a structure may be positioned between a lens and a light source. Accordingly, light with a specified pattern may be distorted by wires disposed on a display panel while passing through the display panel. The distorted light may reduce the sensitivity of a sensor. However, according to another embodiment of the disclosure, the structure 133 may be positioned between the display panel 121 and the cover glass 111, and thus the distortion may not occur in the specified pattern 130*a*. Because no distortion occurs in the specified pattern 130*a*, the distance to the external object 10, the 3D image of the external object 10, or the like, which is obtained by the electronic device 100 (or the processor 620 in FIG. 6), may be highly accurate.

Figure 4:
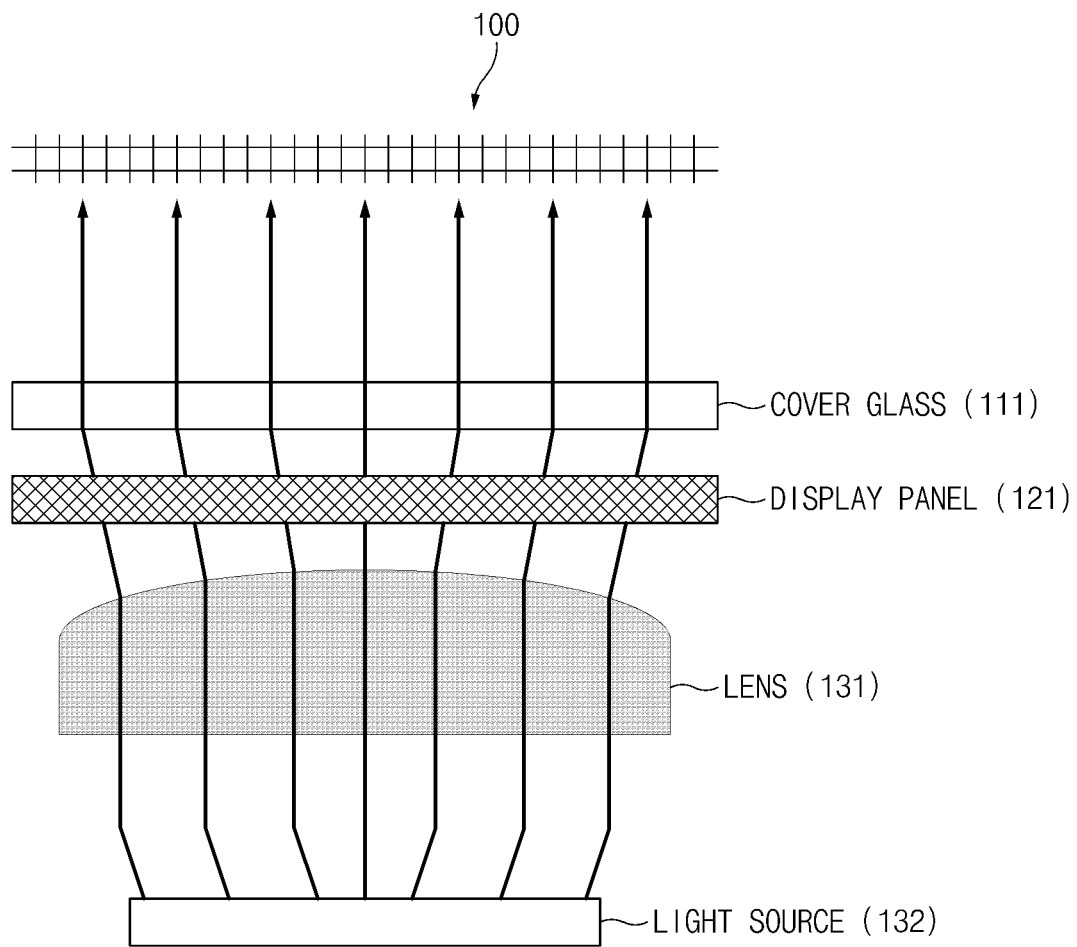
FIG. 4 is a cross-sectional view of an electronic device according to another embodiment.

FIG. 4 is a cross-sectional view of an electronic device according to another embodiment.

Referring to FIG. 4, the electronic device 100 may not include the structure 133. In this case, the electronic device 100 (or the processor 620 in FIG. 6) may calculate a distance to the external object 10 or may obtain the 3D image, using wires disposed on the display panel 121. For example, as illustrated in FIG. 2B, the plurality of sub-pixels (R, G, B) and the wires 121-1, 121-2, 121-3, 121-4, 121-5, 121-6, 121-7, 121*a*, 121*b*, 121*c*, 121*d*, and 121*e* for driving the sub-pixels (R, G, B) may be disposed on the display panel 121. While passing through the display panel 121, light output from the light source 132 may have the specified pattern 130*a* by means of the wires 121-1, 121-2, 121-3, 121-4, 121-5, 121-6, 121-7, 121*a*, 121*b*, 121*c*, 121*d*, and 121*e*. The specified pattern 130*a* may be reflected back from the external object 10. The electronic device 100 (or the processor 620 in FIG. 6) may calculate a distance to the external object 10 or may obtain the 3D image of the external object 10, based on the reflected light.

In the case of an electronic device according to the comparative example, a structure may be positioned between a lens and a light source. Accordingly, light with a specified pattern may be distorted by wires disposed on a display panel while passing through the display panel. The distorted light may reduce the sensitivity of a sensor. However, according to still another embodiment of the disclosure, the specified pattern 130*a* may be formed by using the wires 121-1, 121-2, 121-3, 121-4, 121-5, 121-6, 121-7, 121*a*, 121*b*, 121*c*, 121*d*, and 121*e* disposed on the display panel 121, and thus the distortion may not occur in the specified pattern 130*a*. Accordingly, a distance to the external object 10, a 3D image of the external object 10, or the like, which is obtained by the electronic device 100 (or the processor 620 in FIG. 6), may be highly accurate.

Figure 5:
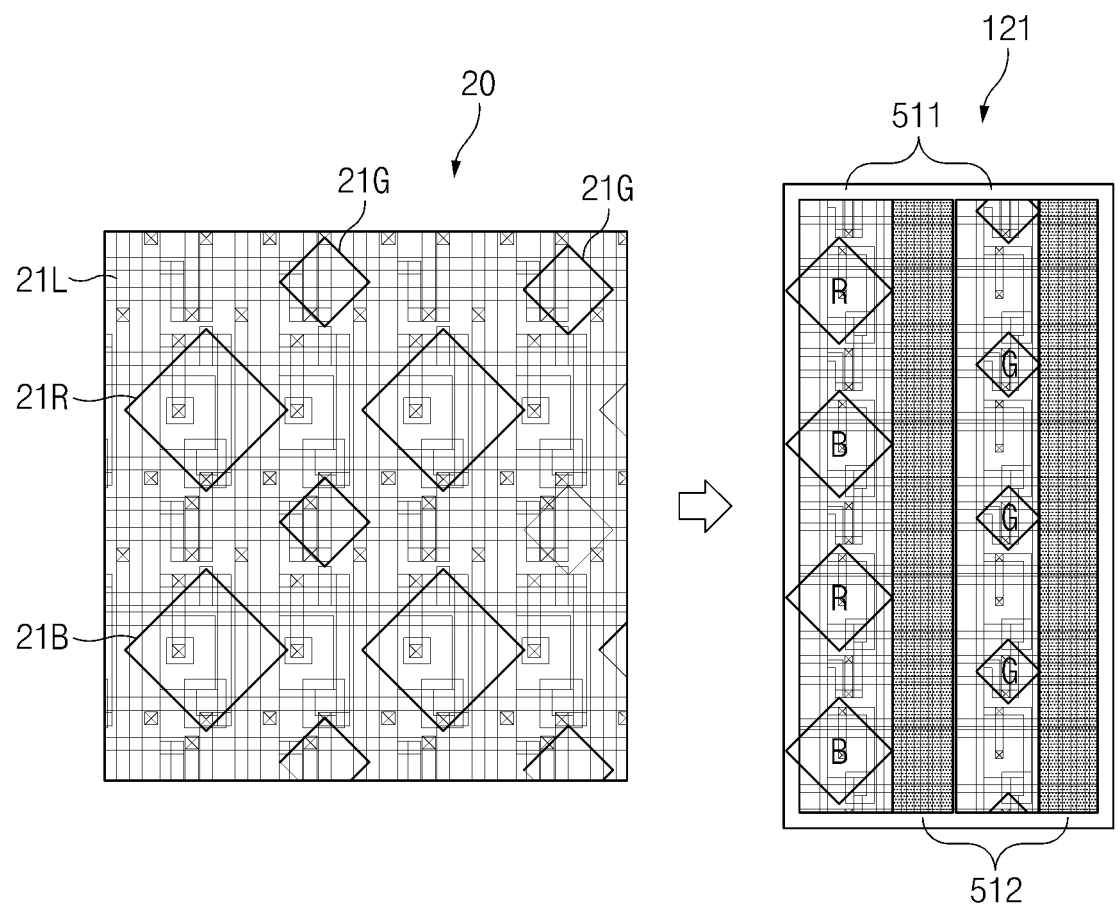
FIG. 5 illustrates a display panel according to a comparative example and a display panel according to still another embodiment of the disclosure.

FIG. 5 illustrates a display panel according to a comparative example and a display panel according to still another embodiment of the disclosure.

Referring to FIG. 5, a plurality of sub-pixels (21R, 21G, 21B) and wires 21L for driving the sub-pixels (21R, 21G, 21B) may be disposed on a display panel 20 according to the comparative example. For example, the wires 21L may be disposed on the display panel 20, and the sub-pixels (21R, 21G, 21B) may be disposed on the wires 21L. According to the comparative example, because the structure is not aligned with the wires 21L, light output from a sensor may be distorted while passing through the display panel 20, thereby reducing the sensitivity of a sensor.

The display panel 121 according to an embodiment of the disclosure may include a first area 511 and a second area 512. The plurality of sub-pixels (R, G, B) and wires for driving the sub-pixels (R, G, B) may be disposed in the first area 511. The structure that allows light output from the sensor 130 to have the specified pattern 130*a* while passing through the second area 512 may be formed in the second area 512. For example, the structure 133 illustrated in FIG. 2A may be disposed in the second area 512. In this case, the light output from the sensor 130 may pass through the second area 512 and then may be reflected back from the external object 10. According to another embodiment of the disclosure, wires for driving the sub-pixels (R, G, B) and a structure, which allows the light output from the sensor 130 to have the specified pattern 130*a* while passing through the structure, are disposed in different areas of the display panel 121, and thus the specified pattern 130*a* may not be distorted. Accordingly, the sensitivity of the sensor 130 may be improved, and the accuracy of data obtained through the sensor 130 may be high.

According to an embodiment of the disclosure, an electronic device may include a cover glass, a back cover facing away from the cover glass, a display panel exposed through the cover glass, a plurality of pixels disposed on the display panel, a plurality of wires electrically connected to the plurality of pixels, a light source interposed between the display panel and the back cover, a lens interposed between the light source and the display panel and refracting light output from the light source, and a structure for passing through the light output from the light source such that the light output from the light source has a specified pattern. The structure may be interposed between the lens and the cover glass.

According to an embodiment of the disclosure, the structure may be interposed between the cover glass and the display panel.

According to an embodiment of the disclosure, the structure may be interposed between the display panel and the lens.

According to an embodiment of the disclosure, a shape of the structure may correspond to a shape in which the plurality of wires are arranged.

According to an embodiment of the disclosure, the electronic device may further include a processor electrically connected to the light source and controlling whether to operate the light source.

According to an embodiment of the disclosure, the processor may measure a distance between the electronic device and an external object based on an extent to which the light having the specified pattern is deformed after being reflected from the external object.

According to an embodiment of the disclosure, the processor may obtain a three-dimensional image of an external object based on an extent to which the light having the specified pattern is deformed after being reflected from the external object.

According to an embodiment of the disclosure, the light output from the light source may be refracted in a specified direction while passing through the lens.

According to an embodiment of the disclosure, the light source may output the light in an infrared band or a visible band.

According to an embodiment of the disclosure, an electronic device may include a cover glass, a back cover facing away from the cover glass, a display panel exposed through the cover glass, a plurality of pixels disposed on the display panel, a plurality of wires electrically connected to the plurality of pixels, and a light source interposed between the display panel and the back cover. Light output from the light source may have a specified pattern while passing through the plurality of wires.

According to an embodiment of the disclosure, the electronic device may further include a lens interposed between the light source and the display panel and refracting the light output from the light source.

According to an embodiment of the disclosure, the electronic device may further include a processor electrically connected to the light source and controlling whether to operate the light source.

According to an embodiment of the disclosure, the processor may measure a distance between the electronic device and an external object based on an extent to which the light having the specified pattern is deformed after being reflected from the external object.

According to an embodiment of the disclosure, the processor may obtain a three-dimensional image of an external object based on an extent to which the light having the specified pattern is deformed after being reflected from the external object.

According to an embodiment of the disclosure, the electronic device may further include a structure having a shape corresponding to a shape in which the plurality of wires are disposed on the display panel. The structure may be attached to the display panel or interposed between the cover glass and the display panel.

According to an embodiment of the disclosure, a display may include a display panel on which a plurality of pixels and a plurality of wires electrically connected to the plurality of pixels are disposed, and a structure parallel to the display panel and passing through light output from an external light source such that the light output from the external light source has a specified pattern. A shape of the structure may correspond to a shape in which the plurality of wires are arranged.

According to an embodiment of the disclosure, the structure may be spaced in a first direction perpendicular to one surface of the display panel or in a second direction opposite to the first direction.

According to an embodiment of the disclosure, a separation distance between the structure and the display panel may be within a specified range.

According to an embodiment of the disclosure, the display may further include a display driver integrated circuit (DDI) electrically connected to the plurality of wires. The DDI may control whether to operate the pixels, through the plurality of wires.

According to an embodiment of the disclosure, each of the plurality of pixels may include a red sub-pixel, a green sub-pixel, and a blue sub-pixel. The plurality of wires may be electrically connected to each of the red sub-pixel, the green sub-pixel, and the blue sub-pixels.

According to an embodiment of the disclosure, an electronic device may include a light output unit for outputting light in a specified wavelength range, a lens for penetrating and outputting the light output from the light output unit, a pattern layer disposed on the lens and outputting the light output from the lens so as to have a specified shape (pattern), and a transparent member (window) for outputting the light output from the pattern layer to the outside of the electronic device.

According to an embodiment of the disclosure, the electronic device may further include a display panel interposed between the transparent member and the lens, a plurality of pixels disposed on the display panel, and a plurality of wires electrically respectively connected to the pixels.

According to an embodiment of the disclosure, the plurality of wires may be disposed on the display panel such that the light output from the pattern layer has the specified shape.

Figure 6:
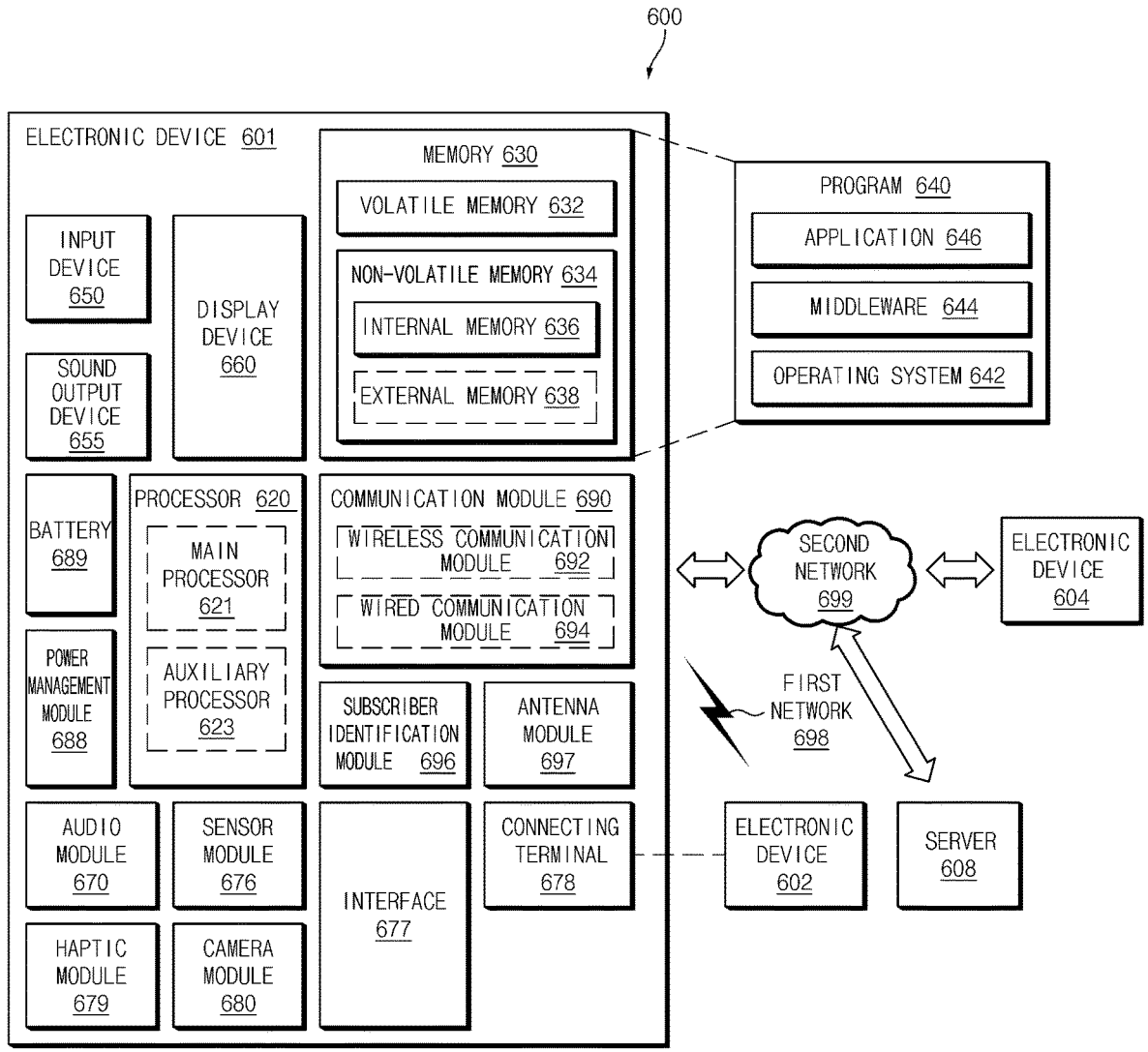
FIG. 6 is a block diagram illustrating an electronic device in a network environment according to various embodiments.

FIG. 6 is a block diagram illustrating an electronic device 601 in a network environment 600 according to various embodiments.

Referring to FIG. 6, the electronic device 601 in the network environment 600 may communicate with an electronic device 602 via a first network 698 (e.g., a short-range wireless communication network), or an electronic device 604 or a server 608 via a second network 699 (e.g., a long-range wireless communication network). According to an embodiment, the electronic device 601 may communicate with the electronic device 604 via the server 608. According to an embodiment, the electronic device 601 may include a processor 620, memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) 696, or an antenna module 697. In some embodiments, at least one (e.g., the display device 660 or the camera module 680) of the components may be omitted from the electronic device 601, or one or more other components may be added in the electronic device 601. In some embodiments, some of the components may be implemented as single integrated circuitry. For example, the sensor module 676 (e.g., a fingerprint sensor, an iris sensor, or an illuminance sensor) may be implemented as embedded in the display device 660 (e.g., a display).

The processor 620 may execute, for example, software (e.g., a program 640) to control at least one other component (e.g., a hardware or software component) of the electronic device 601 coupled with the processor 620, and may perform various data processing or computation. According to one embodiment, as at least part of the data processing or computation, the processor 620 may load a command or data received from another component (e.g., the sensor module 676 or the communication module 690) in volatile memory 632, process the command or the data stored in the volatile memory 632, and store resulting data in non-volatile memory 634. According to an embodiment, the processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or to be specific to a specified function. The auxiliary processor 623 may be implemented as separate from, or as part of the main processor 621.

The auxiliary processor 623 may control at least some of functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). According to an embodiment, the auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by other component (e.g., the processor 620) of the electronic device 601, from the outside (e.g., a user) of the electronic device 601. The input device 650 may include, for example, a microphone, a mouse, a keyboard, or a digital pen (e.g., a stylus pen).

The sound output device 655 may output sound signals to the outside of the electronic device 601. The sound output device 655 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. According to an embodiment, the display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. According to an embodiment, the audio module 670 may obtain the sound via the input device 650, or output the sound via the sound output device 655 or a headphone of an external electronic device (e.g., an electronic device 602) directly (e.g., wiredly) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. According to an embodiment, the sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device (e.g., the electronic device 602) directly (e.g., wiredly) or wirelessly. According to an embodiment, the interface 677 may include, for example, a high definition multimedia interface (HDMI), a universal serial bus (USB) interface, a secure digital (SD) card interface, or an audio interface.

A connecting terminal 678 may include a connector via which the electronic device 601 may be physically connected with the external electronic device (e.g., the electronic device 602). According to an embodiment, the connecting terminal 678 may include, for example, a HDMI connector, a USB connector, a SD card connector, or an audio connector (e.g., a headphone connector).

The haptic module 679 may convert an electrical signal into a mechanical stimulus (e.g., a vibration or a movement) or electrical stimulus which may be recognized by a user via his tactile sensation or kinesthetic sensation. According to an embodiment, the haptic module 679 may include, for example, a motor, a piezoelectric element, or an electric stimulator.

The camera module 680 may capture a still image or moving images. According to an embodiment, the camera module 680 may include one or more lenses, image sensors, image signal processors, or flashes.

The power management module 688 may manage power supplied to the electronic device 601. According to one embodiment, the power management module 688 may be implemented as at least part of, for example, a power management integrated circuit (PMIC).

The battery 689 may supply power to at least one component of the electronic device 601. According to an embodiment, the battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the application processor (AP)) and supports a direct (e.g., wired) communication or a wireless communication. According to an embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™ wireless-fidelity (Wi-Fi) direct, or infrared data association (IrDA)) or the second network 699 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. According to an embodiment, the antenna module 697 may include an antenna including a radiating element composed of a conductive material or a conductive pattern formed in or on a substrate (e.g., PCB). According to an embodiment, the antenna module 697 may include a plurality of antennas. In such a case, at least one antenna appropriate for a communication scheme used in the communication network, such as the first network 698 or the second network 699, may be selected, for example, by the communication module 690 (e.g., the wireless communication module 692) from the plurality of antennas. The signal or the power may then be transmitted or received between the communication module 690 and the external electronic device via the selected at least one antenna. According to an embodiment, another component (e.g., a radio frequency integrated circuit (RFIC)) other than the radiating element may be additionally formed as part of the antenna module 697.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 601 and the external electronic device 604 via the server 608 coupled with the second network 699. Each of the electronic devices 602 and 604 may be a device of a same type as, or a different type, from the electronic device 601. According to an embodiment, all or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

Figure 7:
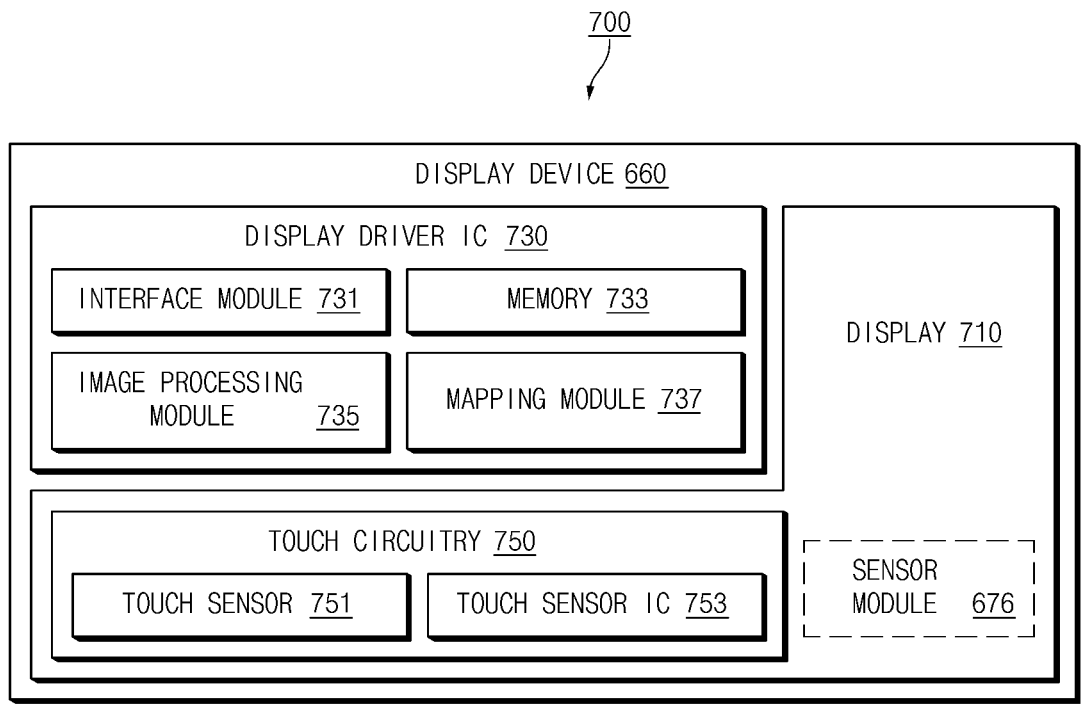
FIG. 7 is a block diagram illustrating the display device according to various embodiments.

FIG. 7 is a block diagram 700 illustrating the display device 660 according to various embodiments.

Referring to FIG. 7, the display device 660 may include a display 710 and a display driver integrated circuit (DDI) 730 to control the display 710. The DDI 730 may include an interface module 731, memory 733 (e.g., buffer memory), an image processing module 735, or a mapping module 737. The DDI 730 may receive image information that contains image data or an image control signal corresponding to a command to control the image data from another component of the electronic device 601 via the interface module 731. For example, according to an embodiment, the image information may be received from the processor 620 (e.g., the main processor 621 (e.g., an application processor)) or the auxiliary processor 623 (e.g., a graphics processing unit) operated independently from the function of the main processor 621. The DDI 730 may communicate, for example, with touch circuitry 650 or the sensor module 676 via the interface module 731. The DDI 730 may also store at least part of the received image information in the memory 733, for example, on a frame by frame basis. The image processing module 735 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 710. The mapping module 737 may generate a voltage value or a current value corresponding to the image data pre-processed or post-processed by the image processing module 735. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 710 may be driven, for example, based at least in part on the voltage value or the current value such that visual information (e.g., a text, an image, or an icon) corresponding to the image data may be displayed via the display 710.

According to an embodiment, the display device 660 may further include the touch circuitry 750. The touch circuitry 750 may include a touch sensor 751 and a touch sensor IC 753 to control the touch sensor 751. The touch sensor IC 753 may control the touch sensor 751 to sense a touch input or a hovering input with respect to a certain position on the display 710. To achieve this, for example, the touch sensor 751 may detect (e.g., measure) a change in a signal (e.g., a voltage, a quantity of light, a resistance, or a quantity of one or more electric charges) corresponding to the certain position on the display 710. The touch circuitry 750 may provide input information (e.g., a position, an area, a pressure, or a time) indicative of the touch input or the hovering input detected via the touch sensor 751 to the processor 620. According to an embodiment, at least part (e.g., the touch sensor IC 753) of the touch circuitry 750 may be formed as part of the display 710 or the DDI 730, or as part of another component (e.g., the auxiliary processor 623) disposed outside the display device 660.

According to an embodiment, the display device 660 may further include at least one sensor (e.g., a fingerprint sensor, an iris sensor, a pressure sensor, or an illuminance sensor) of the sensor module 676 or a control circuit for the at least one sensor. In such a case, the at least one sensor or the control circuit for the at least one sensor may be embedded in one portion of a component (e.g., the display 710, the DDI 730, or the touch circuitry 650)) of the display device 660. For example, when the sensor module 676 embedded in the display device 660 includes a biometric sensor (e.g., a fingerprint sensor), the biometric sensor may obtain biometric information (e.g., a fingerprint image) corresponding to a touch input received via a portion of the display 710. As another example, when the sensor module 676 embedded in the display device 660 includes a pressure sensor, the pressure sensor may obtain pressure information corresponding to a touch input received via a partial or whole area of the display 710. According to an embodiment, the touch sensor 751 or the sensor module 676 may be disposed between pixels in a pixel layer of the display 710, or over or under the pixel layer.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 640) including one or more instructions that are stored in a storage medium (e.g., internal memory 636 or external memory 638) that is readable by a machine (e.g., the electronic device 601). For example, a processor (e.g., the processor 620) of the machine (e.g., the electronic device 601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a cover glass;
a display panel exposed through the cover glass;
a plurality of pixels disposed on the display panel;
a plurality of wires electrically connected to the plurality of pixels;
a light source disposed below the display panel;
a lens interposed between the light source and the display panel and configured to refract light output from the light source;
a structure for passing through the light output from the light source such that the light output from the light source has a specified pattern; and
a processor configured to obtain a three-dimensional image of an external object based on an extent to which the light having the specified pattern is deformed after being reflected from the external object,
wherein the structure is interposed between the lens and the cover glass.

2. The electronic device of claim 1, wherein the structure is interposed between the cover glass and the display panel.

3. The electronic device of claim 1, wherein the structure is interposed between the display panel and the lens.

4. The electronic device of claim 1, wherein a shape of the structure corresponds to a shape in which the plurality of wires are arranged.

5. The electronic device of claim 1,
wherein the processor is electrically connected to the light source and is further configured to control whether to operate the light source.

6. The electronic device of claim 1, wherein the processor is further configured to measure a distance between the electronic device and an external object based on an extent to which the light having the specified pattern is deformed after being reflected from the external object.

7. The electronic device of claim 1, wherein the light output from the light source is refracted in a specified direction while passing through the lens.

8. The electronic device of claim 1, wherein the light source outputs light in an infrared band or a visible band.

9. An electronic device comprising:
a cover glass;
a display panel exposed through the cover glass;
a plurality of pixels disposed on the display panel;
a plurality of wires electrically connected to the plurality of pixels;
a light source disposed below the display panel; and
a processor configured to obtain a three-dimensional image of an external object based on an extent to which the light having a specified pattern is deformed after being reflected from the external object,
wherein light output from the light source has the specified pattern while passing through the plurality of wires.

10. The electronic device of claim 9, further comprising:
a lens interposed between the light source and the display panel and configured to refract the light output from the light source.

11. The electronic device of claim 9,
wherein the processor is electrically connected to the light source and is further configured to control whether to operate the light source.

12. The electronic device of claim 9, wherein the processor is further configured to measure a distance between the electronic device and an external object based on an extent to which the light having the specified pattern is deformed after being reflected from the external object.

13. The electronic device of claim 9, further comprising:
a structure having a shape corresponding to a shape in which the plurality of wires are disposed on the display panel,
wherein the structure is attached to the display panel or interposed between the cover glass and the display panel.

* * * * *